July 19, 1932.  H. J. EDWARDS  1,868,055
OIL BASE FOR INTERNAL COMBUSTION ENGINES
Filed June 28, 1926   2 Sheets-Sheet 2
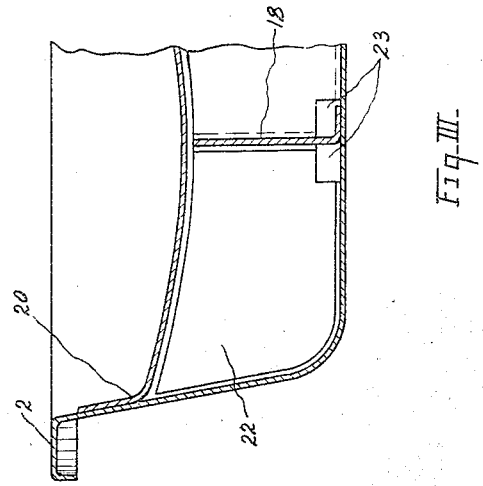
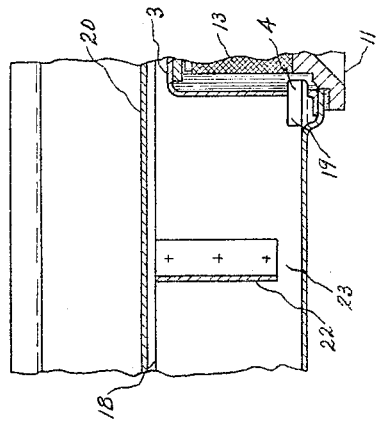
INVENTOR.
HENRY J. EDWARDS
BY Solon J. Boughton
ATTORNEY.

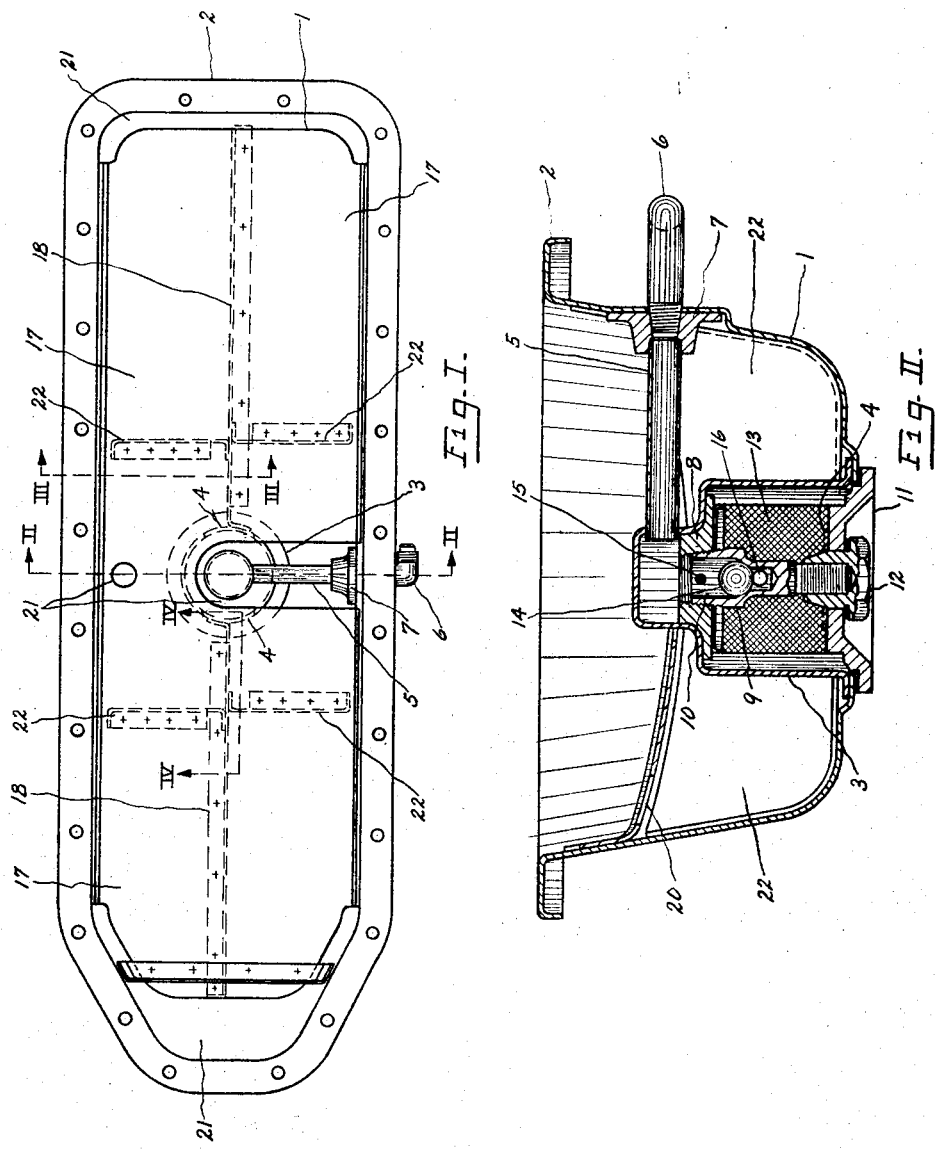

Patented July 19, 1932

1,868,055

UNITED STATES PATENT OFFICE

HENRY J. EDWARDS, OF TOLEDO, OHIO, ASSIGNOR TO THE WILLYS OVERLAND COMPANY, OF TOLEDO, OHIO, A CORPORATION OF OHIO

OIL BASE FOR INTERNAL COMBUSTION ENGINES

Application filed June 28, 1926. Serial No. 119,061.

This invention relates to oil reservoir bases for internal combustion engines, and more particularly to oil bases for automotive vehicle engines.

One of the objects of the invention is to provide an oil base for an automotive vehicle engine that will prevent undue surging of the oil during acceleration and deceleration of the vehicle.

Another object of the invention is to provide an oil base for an automotive vehicle engine that will prevent the oil being thrown away from the oil pump intake when the vehicle travels in a curved path.

Another object of the invention is to provide an oil base for an automotive vehicle engine in which the oil is baffled both longitudinally and laterally of the engine.

Other objects will appear from the description to follow, covering one embodiment of the invention, which for the purposes of the present application, I have illustrated in the accompanying drawings, in which:

Figure I is a plan view of an oil base for an automotive vehicle engine constructed according to my invention.

Fig. II is an enlarged sectional view of the improved oil base taken on lines II—II of Fig. I.

Fig. III is a sectional view taken on line III—III of Fig. I.

Fig. IV is a sectional view taken on line IV—IV of Fig. I.

Referring to the drawings in which like characters refer to like parts throughout the views, 1 is an oil base adapted to form a reservoir for the oil supply of an internal combustion engine (not shown), and to which it may be attached by means of flange 2. Within base 1 is mounted a suction bell 3 which has oil openings 4 near the bottom of the oil base, but which is substantially air tight at its upper end. A conduit 5 is tightly fitted within the upper portion of bell 3 and is led through the side of base 1 to a pipe 6 leading to an ordinary oil pump (not shown). Bell 3 is preferably secured to the bottom of base 1 by any suitable method, such as welding, and conduit 5 is preferably supported at the side of the base by a boss 7 secured to the side of the base by welding or other means.

Within bell 3 and forming an integral part therewith, is a plug member 8 in which is threaded a fitting 9 having a passageway 10 and a cross-passageway 16 to provide communication between the upper and lower parts of the bell. It is desirable that the oil base be drained periodically, consequently I have utilized the lower part of fitting 9 as a threaded stem by which drain cover 11 is tightly held in contact with the lower side of base 1 by nut 12. A cylindrical screen 13 may be supported by cover 11 within the bell and a check valve 14 having a stop 15, may be installed within the fitting 9 to prevent backward flow of oil.

Base 1 is necessarily of considerable length and breadth in order to cover the base of the engine (not shown) and for automotive vehicle use, any oil contained therein is subjected to inertia forces in stopping and starting, and centrifugal forces in rounding curves. These forces produce undesirable surging of the oil which at times may be thrown away from the oil intake and temporarily stop the oil flow through the lubricating system.

To prevent the surging action mentioned above, I prefer to locate the intake bell 3 at about the center of the oil base, and to divide the base into two lengthwise compartments 17, by partitions 18 which extend from the ends of base 1 to the intake bell, and form therewith a single baffle extending the length of the base. Partitions 18 are preferably secured to the ends and bottom of the base by any desired method such as welding, and closely engage the bell 3 to prevent oil flow of any appreciable amount between compartments 17. Openings 19 are formed in the partition near the bottom of the base and preferably are located adjacent openings 4 in the suction bell 3.

A substantially horizontal baffle 20 extends over the greater portion of the base 1, at a height slightly above the level of the normal quantity of oil carried in the base 1. Baffle 20 may be secured to the sides of the oil base by welding and should be provided with openings or clearance spaces 21 at the center and ends to permit oil deposited above the baffle to return to the base. Lateral baffles 22 extend from the partitions 18 to the side of base 1 and are preferably welded thereto, openings 23 being provided in the lateral baffles near the bottom of the base and preferably near partitions 18. Both the longitudinal and horizontal baffles are of sufficient height to reach or project above the normal level of the oil carried in the base. Openings 4 in the suction bell are of some appreciable length and are preferably arranged so that a portion of each opening 4 is on each side of the longitudinal baffle.

Under actual service conditions of automotive vehicle use, an engine equipped with my improved oil base will have the flow of oil within the base 1 so restricted, that upon starting or stopping the flow will be retarded by the lateral baffles 22 and upon rounding a curve by the longitudinal partitions 18. There will be a tendency for the oil within the various compartments to flow from one to another but as the longitudinal baffle openings 19 are adjacent bell openings 4, and the lateral baffle openings 23 are adjacent the longitudinal baffle, of which bell 3 forms a part, all flow between the compartments will tend to deliver a part of the oil through openings 4 into the intake bell.

While I have illustrated and described somewhat in detail certain embodiments of my invention, it is to be understood that this showing and description are illustrative only, and that I do not regard the invention as limited to the details of construction illustrated and described, except insofar as I have included such limitations within the terms of the following claims, in which it is my intention to claim all novelty inherent in the invention, broadly, as well as specifically.

I claim:

1. In an internal combustion engine oil base, the combination of an oil intake having an opening adjacent the bottom of said base, and a longitudinal oil baffle therein having an opening adjacent said intake opening whereby oil passing through the baffle opening in either direction will flow toward said intake opening.

2. In an oil base for an internal combustion engine, the combination of an oil intake having an opening adjacent the bottom of said base, a longitudinal oil baffle therein having an opening adjacent said intake opening, and a lateral baffle on each side of said longitudinal baffle having an opening near the bottom of said base and adjacent said longitudinal baffle.

3. In an oil base for an internal combustion engine, the combination of a vertical walled intake therein, longitudinal vertical partitions in said base coacting with the walls of said intake to form a pair of lengthwise compartments in said base, and said walled intake having an aperture therein opening into both of said compartments.

4. In an oil base for an internal combustion engine, a vertical walled oil intake within said base, a pair of vertical partitions secured to the ends and bottom of said base and extending inwardly to the walls of said intake, and the walls of said intake having openings adjacent the inner ends of said partitions of sufficient width to permit a portion of the openings to lie on each side of said partitions.

5. In an oil base for an internal combustion engine, comprising a bottom and side and end walls, a vertical walled oil intake between said base walls and having openings adjacent the bottom of said base, partitions extending in opposite directions from the walls of said intake and secured to the bottom and the end walls of said base, and said intake having said openings arranged on opposite sides of said partitions.

6. In an oil base for an internal combustion engine comprising bottom, side and end walls, a vertical walled oil intake between said base walls, vertical partitions extending from the walls of said intake and arranged to divide said base into two compartments, other partitions extending from said first mentioned partition to the walls of said base, and all of said partitions having openings therein adjacent the bottom of said base.

7. In an internal combustion engine oil base having a bottom and side and end walls, a vertical longitudinal baffle secured to the ends and bottom of said base and dividing said base into compartments, an oil intake within said base and having openings to each of said compartments, and other baffles within said compartments for restricting oil flow therein.

8. An internal combustion engine oil base having side and end walls, vertical partitions therein, certain of which extend between the end walls and others of which extend between the side walls and the first mentioned partition, an oil intake extending upwardly from near the bottom of said base, said intake having an opening adjacent the bottom of said base, and all of said partitions having openings therein for restricting oil flow therethrough.

9. In an internal combustion engine oil base the combination of an oil intake, a baffle having openings arranged to divide said base in two compartments, and said baffle having all openings therein arranged adjacent said oil intake whereby flow between the compartments will occur adjacent said intake.

10. In an oil base for an internal combustion engine the combination of a vertical walled oil intake bell secured within said base and in communication therewith, said bell having an opening to the outside of said base, a removable cover normally closing said opening, means for holding said cover in its closed position, partitions within said base and coacting with said bell to restrict oil flow within said base, said partitions having openings adjacent said bell, whereby oil is permitted to flow from both sides of said partitions into said bell and out of the base when the cover is removed.

11. In combination with an oil base, a suction bell attached to and extending upwardly from said base, a rigid stem in said bell provided with a perforation through which the oil must pass in leaving said bell, a drain plug adapted to seat within the lower end of said bell, and means upon said stem for supporting the said plug in operative position.

In testimony whereof, I affix my signature.

HENRY J. EDWARDS.